(12) United States Patent
Bergland et al.

(10) Patent No.: US 8,599,208 B2
(45) Date of Patent: Dec. 3, 2013

(54) SHARED READABLE AND WRITEABLE GLOBAL VALUES IN A GRAPHICS PROCESSOR UNIT PIPELINE

(75) Inventors: Tyson J. Bergland, Palo Alto, CA (US); Craig M. Okruhlica, San Jose, CA (US); Edward A. Hutchins, Mountain View, CA (US); Michael J. M. Toksvig, Palo Alto, CA (US); Justin M. Mahan, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 1079 days.

(21) Appl. No.: 11/893,622

(22) Filed: Aug. 15, 2007

(65) Prior Publication Data

US 2009/0046103 A1    Feb. 19, 2009

(51) Int. Cl.
*G06F 12/02* (2006.01)
*G06F 15/80* (2006.01)
*G09G 5/36* (2006.01)

(52) U.S. Cl.
USPC ............................ 345/566; 345/505; 345/559

(58) Field of Classification Search
USPC ........................................................ 345/559
See application file for complete search history.

(56) References Cited

U.S. PATENT DOCUMENTS

| | | | |
|---|---|---|---|
| 4,620,217 A | 10/1986 | Songer | |
| 4,648,045 A | 3/1987 | Demetrescu | |
| 4,700,319 A | 10/1987 | Steiner | |
| 4,862,392 A | 8/1989 | Steiner | |
| 4,901,224 A | 2/1990 | Ewert | |
| 5,185,856 A | 2/1993 | Alcorn et al. | |
| 5,357,604 A | 10/1994 | San et al. | |
| 5,392,393 A | 2/1995 | Deering | |
| 5,491,496 A | 2/1996 | Tomiyasu | |
| 5,577,213 A | 11/1996 | Avery et al. | |
| 5,581,721 A * | 12/1996 | Wada et al. | 712/200 |
| 5,600,584 A | 2/1997 | Schlafly | |
| 5,655,132 A * | 8/1997 | Watson | 718/104 |
| 5,850,572 A * | 12/1998 | Dierke | 710/53 |
| 5,941,940 A | 8/1999 | Prasad et al. | |
| 5,977,977 A | 11/1999 | Kajiya et al. | |
| 6,118,452 A | 9/2000 | Gannett | |
| 6,173,366 B1 | 1/2001 | Thayer et al. | |

(Continued)

FOREIGN PATENT DOCUMENTS

JP    62080785 A2    4/1987
JP    05150979 A2    6/1993

(Continued)

OTHER PUBLICATIONS

The Free Online Dictionary, Thesaurus and Encyclopedia, definition for cache; http://www.thefreedictionary.com/cache; retrieved Aug. 17, 2012.*

(Continued)

*Primary Examiner* — Carlos Perromat (57) ABSTRACT

An arithmetic logic stage in a graphics processor unit includes arithmetic logic units (ALUs) and global registers. The registers contain global values for a group of pixels. Global values may be read from any of the registers, regardless of which of the pixels is being operated on by the ALUs. However, when writing results of the ALU operations, only some of the global registers are candidates to be written to, depending on the pixel number. Accordingly, overwriting of data is prevented.

17 Claims, 8 Drawing Sheets

(56) References Cited

U.S. PATENT DOCUMENTS

| | | |
|---|---|---|
| 6,333,744 B1 | 12/2001 | Kirk et al. |
| 6,351,806 B1 | 2/2002 | Wyland |
| 6,353,439 B1 | 3/2002 | Lindholm et al. |
| 6,466,222 B1 | 10/2002 | Kao et al. |
| 6,496,537 B1 | 12/2002 | Kranawetter et al. |
| 6,526,430 B1 | 2/2003 | Hung et al. |
| 6,557,022 B1 | 4/2003 | Sih et al. |
| 6,624,818 B1 | 9/2003 | Mantor et al. |
| 6,636,221 B1 | 10/2003 | Morein |
| 6,636,223 B1 | 10/2003 | Morein |
| 6,778,181 B1 | 8/2004 | Kilgariff et al. |
| 6,806,886 B1 | 10/2004 | Zatz |
| 6,839,828 B2 | 1/2005 | Gschwind et al. |
| 6,924,808 B2 | 8/2005 | Kurihara et al. |
| 6,947,053 B2 | 9/2005 | Malka et al. |
| 6,980,209 B1 | 12/2005 | Donham et al. |
| 6,999,100 B1 | 2/2006 | Leather et al. |
| 7,280,112 B1 | 10/2007 | Hutchins |
| 7,298,375 B1 | 11/2007 | Hutchins |
| 7,477,260 B1 | 1/2009 | Nordquist |
| 7,659,909 B1 | 2/2010 | Hutchins |
| 7,710,427 B1 | 5/2010 | Hutchins et al. |
| 7,928,990 B2 | 4/2011 | Jiao et al. |
| 7,941,645 B1 | 5/2011 | Riach et al. |
| 2002/0129223 A1 | 9/2002 | Takayama et al. |
| 2002/0169942 A1 | 11/2002 | Sugimoto |
| 2003/0115233 A1 | 6/2003 | Hou et al. |
| 2004/0114813 A1 | 6/2004 | Boliek et al. |
| 2004/0130552 A1 | 7/2004 | Duluk, Jr. et al. |
| 2005/0122330 A1 | 6/2005 | Boyd et al. |
| 2005/0135433 A1 | 6/2005 | Chang et al. |
| 2005/0223195 A1 | 10/2005 | Kawaguchi |
| 2006/0028469 A1* | 2/2006 | Engel ............................ 345/426 |
| 2006/0152519 A1* | 7/2006 | Hutchins et al. .............. 345/561 |
| 2006/0155964 A1 | 7/2006 | Totsuka |
| 2006/0177122 A1 | 8/2006 | Yasue |
| 2006/0288195 A1 | 12/2006 | Ma et al. |
| 2007/0279408 A1 | 12/2007 | Zheng et al. |
| 2007/0285427 A1 | 12/2007 | Morein et al. |

FOREIGN PATENT DOCUMENTS

| | | |
|---|---|---|
| JP | 07084965 A2 | 3/1995 |
| JP | 11053187 A2 | 2/1999 |
| JP | 2000047872 A2 | 2/2000 |
| JP | 2002073330 A2 | 3/2002 |
| JP | 2004303026 A1 | 10/2004 |
| WO | 2005114646 A2 | 12/2005 |

OTHER PUBLICATIONS

"Interleaved Memory." Dec. 26, 2002. http://www.webopedia.com/TERM/I/interleaved_memory.html.

Pirazzi, Chris. "Fields, F1/F2, Interleave, Field Dominance and More." Nov. 4, 2001. http://lurkertech.com/Ig/dominance.html.

Hennessy, et al., Computer Organization and Design: The Hardware/Software Interface, 1997, Section 6.5.

Moller, et al.; Real-Time Rendering, 2nd ed., 2002, A K Peters Ltd., pp. 92-99, 2002.

Hollasch; IEEE Standard 754 Floating Point Numbers; http://steve.hollasch.net/cgindex/coding/ieeefloat.html; dated Feb. 24, 2005; retrieved Oct. 21, 2010.

Microsoft; (Complete) Tutorial to Understand IEEE Floating-Point Errors; http://support.microsoft.com/kb/42980; dated Aug. 16, 2005; retrieved Oct. 21, 2010.

* cited by examiner

| | | | | | |
|---|---|---|---|---|---|
| Sideband 420 | | | | | 1st Row of Next Quad |
| " | (I3) | P3r12 | P3r13 | P3r14 | P3r15 | Row 15 (P3R3) |
| " | ⋮ | ⋮ | ⋮ | ⋮ | ⋮ | Rows 8-14 |
| " | (I1) | P3r4 | P3r5 | P3r6 | P3r7 | Row 7 (P3R1) |
| " | (I1) | P2r4 | P2r5 | P2r6 | P2r7 | Row 6 (P2R1) |
| " | (I1) | P1r4 | P1r5 | P1r6 | P1r7 | Row 5 (P1R1) |
| " | (I1) | P0r4 | P0r5 | P0r6 | P0r7 | Row 4 (P0R1) |
| " | (I0) | P3r0 | P3r1 | P3r2 | P3r3 | Row 3 (P3R0) |
| " | (I0) | P2r0 | P2r1 | P2r2 | P2r3 | Row 2 (P2R0) |
| " | (I0) | P1r0 | P1r1 | P1r2 | P1r3 | Row 1 (P1R0) |
| Sideband 420 | (I0) | P0r0 | P0r1 | P0r2 | P0r3 | Row 0 (P0R0) |
| " | | | | | | Last Row of Previous Quad |

Direction of Flow ↓

| Clock | Pixel | Instruction | |
|---|---|---|---|
| C15 | P3 | I3 | Direction of Flow ↓ |
| C14 | P2 | I3 | |
| C13 | P1 | I3 | |
| C12 | P0 | I3 | |
| C11 | P3 | I2 | |
| C10 | P2 | I2 | |
| C9 | P1 | I2 | |
| C8 | P0 | I2 | |
| C7 | P3 | I1 | |
| C6 | P2 | I1 | |
| C5 | P1 | I1 | |
| C4 | P0 | I1 | |
| C3 | P3 | I0 | |
| C2 | P2 | I0 | |
| C1 | P1 | I0 | |
| C0 | P0 | I0 | |

SHARED READABLE AND WRITEABLE GLOBAL VALUES IN A GRAPHICS PROCESSOR UNIT PIPELINE

RELATED U.S. APPLICATIONS

This application is related to U.S. patent application Ser. No. 11/893,499 by T. Bergland et al., filed on Aug. 15, 2007, entitled "Buffering Deserialized Pixel Data in a Graphics Processor Unit Pipeline," assigned to the assignee of the present invention, and hereby incorporated by reference in its entirety.

This application is related to U.S. patent application Ser. No. 11/893,620 by T. Bergland et al., filed on Aug. 15, 2007, entitled "A Conditional Execute Bit in a Graphics Processor Unit Pipeline," assigned to the assignee of the present invention, and hereby incorporated by reference in its entirety.

FIELD

Embodiments of the present invention generally relate to computer graphics.

BACKGROUND

Recent advances in computer performance have enabled graphics systems to provide more realistic graphical images using personal computers, home video game computers, handheld devices, and the like. In such graphics systems, a number of procedures are executed to render or draw graphics primitives to the screen of the system. A graphics primitive is a basic component of a graphic, such as a point, line, polygon, or the like. Rendered images are formed with combinations of these graphics primitives. Many procedures may be utilized to perform three-dimensional (3-D) graphics rendering.

Specialized graphics processing units (GPUs) have been developed to increase the speed at which graphics rendering procedures are executed. The GPUs typically incorporate one or more rendering pipelines. Each pipeline includes a number of hardware-based functional units that are designed for high-speed execution of graphics instructions/data. Generally, the instructions/data are fed into the front end of a pipeline and the computed results emerge at the back end of a pipeline. The hardware-based functional units, cache memories, firmware, and the like, of the GPUs are designed to operate on the basic graphics primitives and produce real-time rendered 3-D images.

There is increasing interest in rendering 3-D graphical images in portable or handheld devices such as cell phones, personal digital assistants (PDAs), and other devices. However, portable or handheld devices generally have limitations relative to more full-sized devices such as desktop computers. For example, because portable devices are typically battery-powered, power consumption is a concern. Also, because of their smaller size, the space available inside portable devices is limited. The desire is to quickly perform realistic 3-D graphics rendering in a handheld device, within the limitations of such devices.

SUMMARY

Embodiments of the present invention provide methods and systems for quickly and efficiently processing data in a graphics processor unit pipeline.

In one embodiment, an arithmetic logic stage in a graphics processor unit includes arithmetic logic units (ALUs) and global registers. The registers contain global values for a group of pixels. Global values may be read from any of the registers, regardless of which of the pixels is being operated on by the ALUs. Because each of the global registers is readable, there is more flexibility when it comes to performing arithmetic operations that rely on pixel data for different rows, pixels or groups of pixels.

However, when writing the result of an ALU operation, only some of the global registers are candidates to be written to. That is, only global registers that are specifically associated with the pixel exiting the ALUs are candidates to be written to.

Pixel data for a group of pixels proceeds collectively down the graphics pipeline. In one embodiment, the pixel data for each pixel in the group is separated into subsets or rows of data. In the ALUs, the same instruction is applied to all pixels in a group. Results for each pixel emerge from the ALUs on successive clock cycles. Because the same instruction is executed on successive clock cycles, the same destination is specified for those results unless the destination is aliased.

Embodiments of the present invention automatically alias the destination of the results—the result is directed to a different destination depending on the pixel associated with the result. Because a new global value may be created each clock cycle in pipeline fashion, registers that are candidates to be written to include only some subset of the global registers. In one embodiment, the pixel number of the pixel exiting the ALUs is used to select the register or registers that the result can be written to. By controlling which of the global registers are written to when processing a given pixel, global values that may be needed for subsequent operations are protected from being overwritten.

Use of global registers in this manner promotes programming flexibility without a commensurate increase in the number of registers. Accordingly, embodiments of the present invention facilitate quick and efficient graphics processing within the size and power constraints associated with handheld devices and other portable, battery-operated devices (although the present invention is not limited to use on those types of devices).

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "performing" or "producing" or "storing" or "reading" or "writing" or "identifying" or "selecting" or "processing" or "loading" or "accessing" or "routing" or the like, refer to the actions and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
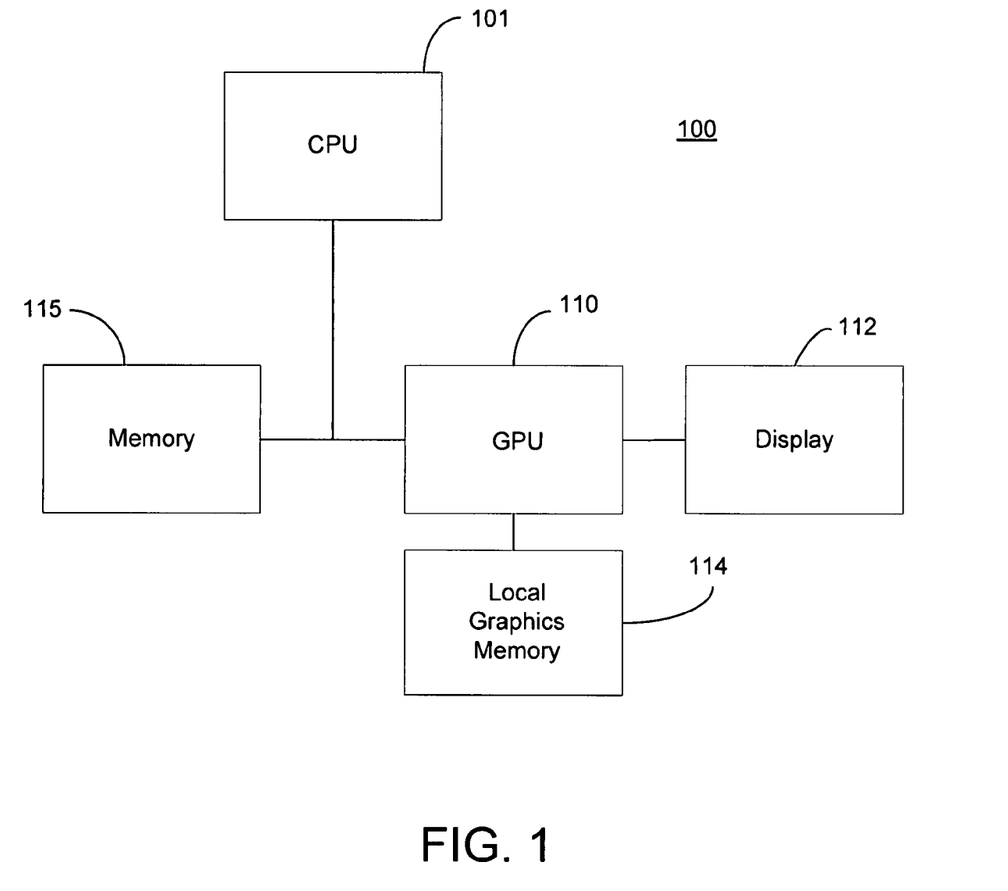
FIG. 1 is a block diagram showing components of a computer system in accordance with one embodiment of the present invention.

FIG. 1 shows a computer system 100 in accordance with one embodiment of the present invention. The computer system includes the components of a basic computer system in accordance with embodiments of the present invention providing the execution platform for certain hardware-based and software-based functionality. In general, the computer system comprises at least one central processing unit (CPU) 101, a system memory 115, and at least one graphics processor unit (GPU) 110. The CPU can be coupled to the system memory via a bridge component/memory controller (not shown) or can be directly coupled to the system memory via a memory controller (not shown) internal to the CPU. The GPU is coupled to a display 112. One or more additional GPUs can optionally be coupled to system 100 to further increase its computational power. The GPU(s) is/are coupled to the CPU and the system memory. The computer system can be implemented as, for example, a desktop computer system or server computer system, having a powerful general-purpose CPU coupled to a dedicated graphics rendering GPU. In such an embodiment, components can be included that add peripheral buses, specialized graphics memory, input/output (I/O) devices, and the like. Similarly, computer system can be implemented as a handheld device (e.g., a cell phone, etc.) or a set-top video game console device.

The GPU can be implemented as a discrete component, a discrete graphics card designed to couple to the computer system via a connector (e.g., an Accelerated Graphics Port slot, a Peripheral Component Interconnect-Express slot, etc.), a discrete integrated circuit die (e.g., mounted directly on a motherboard), or an integrated GPU included within the integrated circuit die of a computer system chipset component (not shown) or within the integrated circuit die of a PSOC (programmable system-on-a-chip). Additionally, a local graphics memory 114 can be included for the GPU for high bandwidth graphics data storage.

Figure 2:
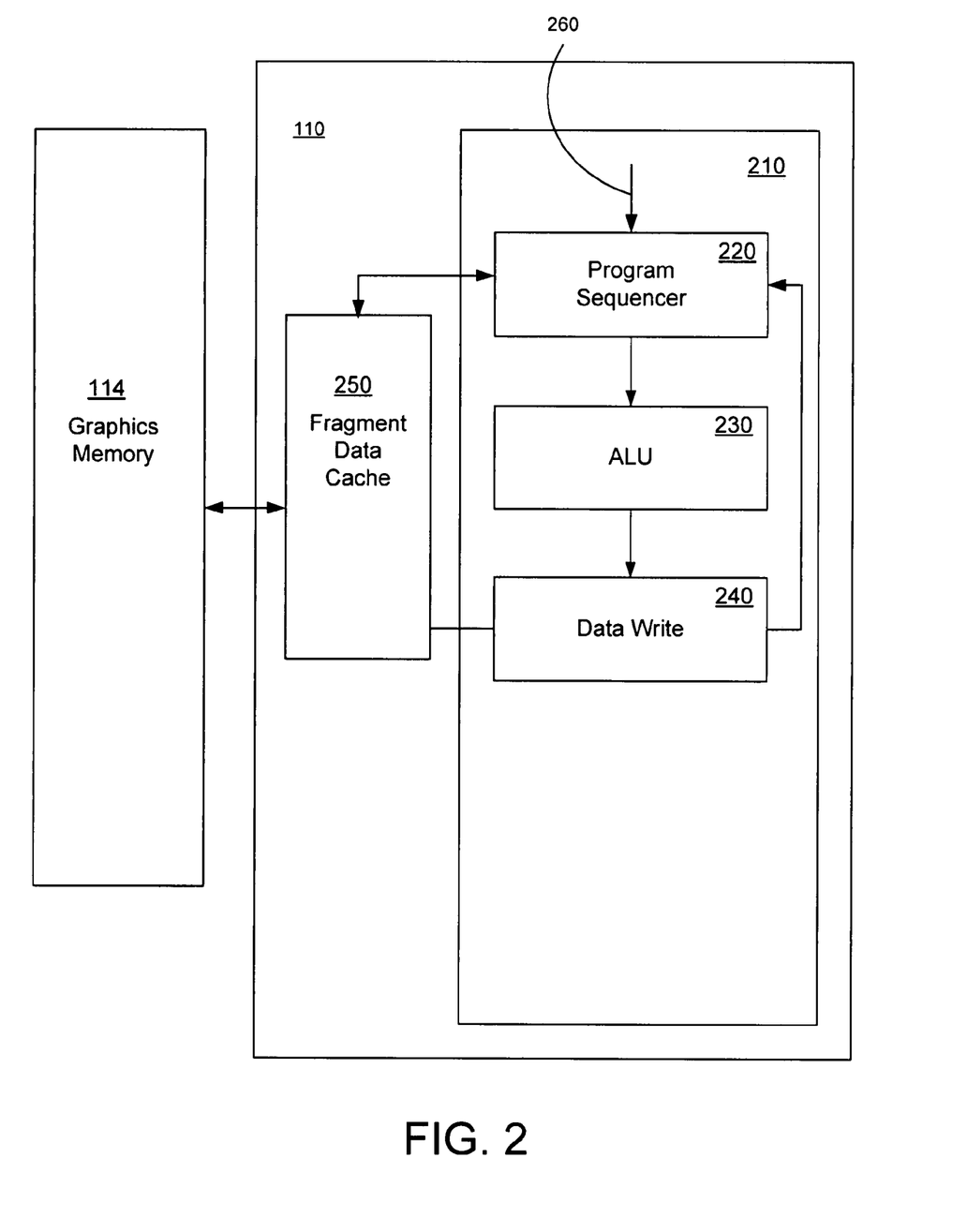
FIG. 2 is a block diagram showing components of a graphics processing unit (GPU) in accordance with one embodiment of the present invention.

FIG. 2 shows a diagram illustrating internal components of the GPU 110 and the graphics memory 114 in accordance with one embodiment of the present invention. As depicted in FIG. 2, the GPU includes a graphics pipeline 210 and a fragment data cache 250 which couples to the graphics memory as shown.

In the example of FIG. 2, a graphics pipeline 210 includes a number of functional modules. Three such functional modules of the graphics pipeline—for example, the program sequencer 220, the arithmetic logic stage (ALU) 230, and the data write component 240—function by rendering graphics primitives that are received from a graphics application (e.g., from a graphics driver, etc.). The functional modules 220-240 access information for rendering the pixels related to the graphics primitives via the fragment data cache 250. The fragment data cache functions as a high-speed cache for the information stored in the graphics memory (e.g., frame buffer memory).

The program sequencer functions by controlling the operation of the functional modules of the graphics pipeline. The program sequencer can interact with the graphics driver (e.g., a graphics driver executing on the CPU 101 of FIG. 1) to control the manner in which the functional modules of the graphics pipeline receive information, configure themselves for operation, and process graphics primitives. For example, in the FIG. 2 embodiment, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the graphics pipeline over a common input 260 from an upstream functional module (e.g., from an upstream raster module, from a setup module, or from the graphics driver). The input 260 functions as the main fragment data pathway, or pipeline, between the functional modules of the graphics pipeline. Primitives are generally received at the front end of the pipeline and are progressively rendered into resulting rendered pixel data as they proceed from one module to the next along the pipeline.

In one embodiment, data proceeds between the functional modules 220-240 in a packet-based format. For example, the graphics driver transmits data to the GPU in the form of data packets, or pixel packets, that are specifically configured to interface with and be transmitted along the fragment pipe communications pathways of the pipeline. A pixel packet generally includes information regarding a group or tile of pixels (e.g., four pixels, eight pixels, 16 pixels, etc.) and coverage information for one or more primitives that relate to the pixels. A pixel packet can also include sideband information that enables the functional modules of the pipeline to configure themselves for rendering operations. For example, a pixel packet can include configuration bits, instructions, functional module addresses, etc., that can be used by one or more of the functional modules of the pipeline to configure itself for the current rendering mode, or the like. In addition to pixel rendering information and functional module configuration information, pixel packets can include shader program instructions that program the functional modules of the pipeline to execute shader processing on the pixels. For example, the instructions comprising a shader program can be transmitted down the graphics pipeline and be loaded by one or more designated functional modules. Once loaded, during rendering operations, the functional module can execute the shader program on the pixel data to achieve the desired rendering effect.

In this manner, the highly optimized and efficient fragment pipe communications pathway implemented by the functional modules of the graphics pipeline can be used not only to transmit pixel data between the functional modules (e.g., modules 220-240), but to also transmit configuration information and shader program instructions between the functional modules.

Figure 3:
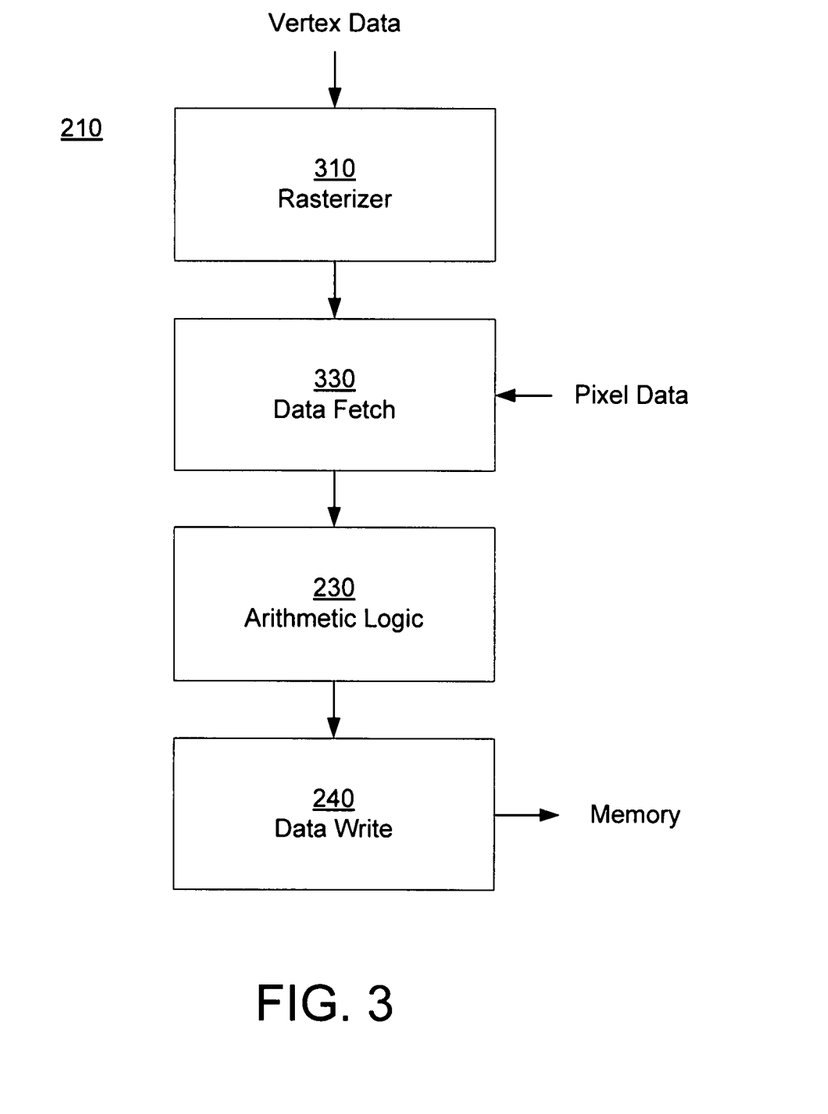
FIG. 3 illustrates stages in a GPU pipeline according to one embodiment of the present invention.

FIG. 3 is a block diagram showing selected stages in a graphics pipeline 210 according to one embodiment of the present invention. A graphics pipeline may include additional stages or it may be arranged differently than the example of FIG. 3. In other words, although the present invention is discussed in the context of the pipeline of FIG. 3, the present invention is not so limited.

In the example of FIG. 3, the rasterizer 310 translates triangles to pixels using interpolation. Among its various functions, the rasterizer receives vertex data, determines which pixels correspond to which triangle, and determines shader processing operations that need to be performed on a pixel as part of the rendering, such as color, texture, and fog operations.

The rasterizer generates a pixel packet for each pixel of a triangle that is to be processed. A pixel packet is, in general, a set of descriptions used for calculating an instance of a pixel value for a pixel in a frame of a graphical display. A pixel packet is associated with each pixel in each frame. Each pixel is associated with a particular (x,y) location in screen coordinates. In one embodiment, the graphics system renders a two pixel-by-two pixel region of a display screen, referred to as a quad.

Each pixel packet includes a payload of pixel attributes required for processing (e.g., color, texture, depth, fog, x and y locations, etc.) and sideband information (pixel attribute data is provided by the data fetch stage 330). A pixel packet may contain one row of data or it may contain multiple rows of data. A row is generally the width of the data portion of the pipeline bus.

The data fetch stage fetches data for pixel packets. Such data may include color information, any depth information, and any texture information for each pixel packet. Fetched data is placed into an appropriate field, which may be referred to herein as a register, in a row of pixel data prior to sending the pixel packet on to the next stage.

From the data fetch stage, rows of pixel data enter the arithmetic logic stage 230. In the present embodiment, one row of pixel data enters the arithmetic logic stage each clock cycle. In one embodiment, the arithmetic logic stage includes four ALUs 0, 1, 2 and 3 (FIG. 5) configured to execute a shader program related to three-dimensional graphics operations such as, but not limited to, texture combine (texture environment), stencil, fog, alpha blend, alpha test, and depth test. Each ALU executes an instruction per clock cycle, each instruction for performing an arithmetic operation on operands that correspond to the contents of the pixel packets. In one embodiment, it takes four clock cycles for a row of data to be operated on in an ALU—each ALU has a depth of four cycles.

The output of the arithmetic logic stage goes to the data write stage. The data write stage stores pipeline results in a write buffer or in a framebuffer in memory (e.g., graphics memory 114 or memory 115 of FIGS. 1 and 2). Optionally, pixel packets/data can be recirculated from the data write stage back to the arithmetic logic stage if further processing of the data is needed.

Figure 4:
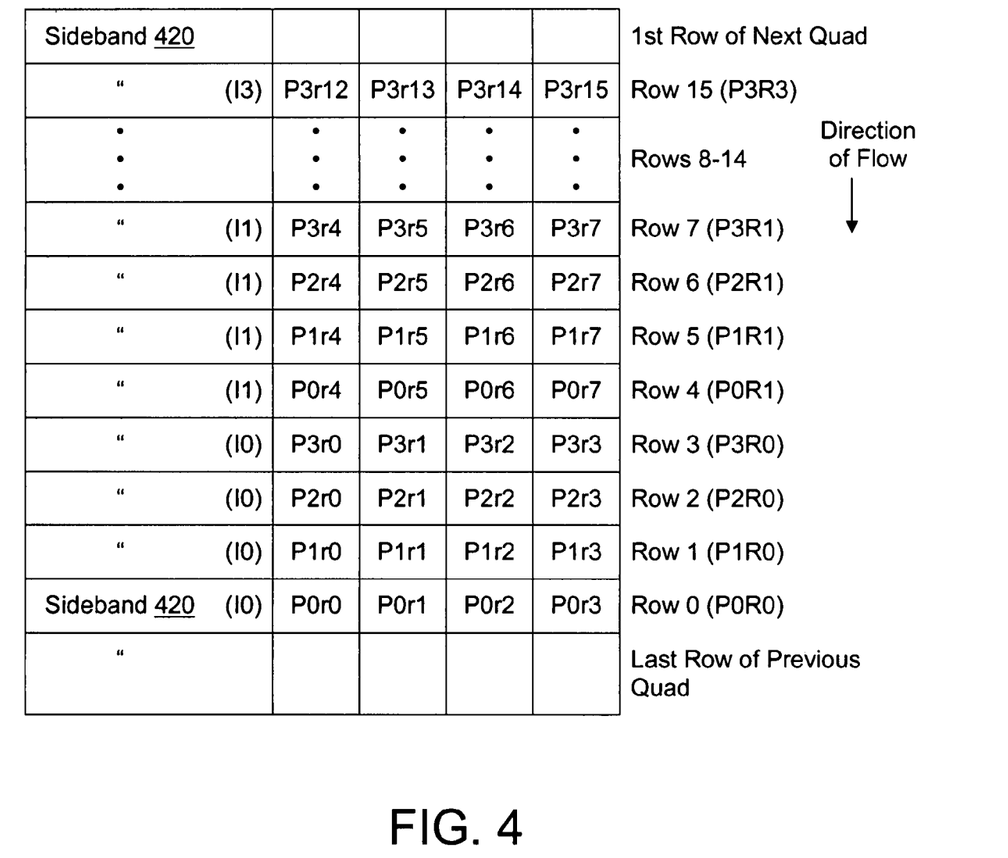
FIG. 4 illustrates a series of rows of pixel data according to an embodiment of the present invention.

FIG. 4 illustrates a succession of pixel data—that is, a series of rows of pixel data—for a group of pixels according to an embodiment of the present invention. In the example of FIG. 4, the group of pixels comprises a quad of four pixels: P0, P1, P2 and P3. As mentioned above, the pixel data for a pixel can be separated into subsets or rows of data. For example, row 0 includes four fields or registers of pixel data P0$r$0, P0$r$1, P0$r$2 and P0$r$3 ("r" designates a field or register in a row, and "R" designates a row). Each of the rows may represent one or more attributes of the pixel data. These attributes include, but are not limited to, z-depth values, texture coordinates, level of detail, color, and alpha. The register values can be used as operands in operations executed by the ALUs in the arithmetic logic stage.

Sideband information 420 is associated with each row of pixel data. The sideband information includes, among other things, information that identifies or points to an instruction that is to be executed by an ALU using the pixel data identified by the instruction. In other words, the sideband information associated with row 0 identifies, among other things, an instruction 10. An instruction can specify, for example, the type of arithmetic operation to be performed and which registers contain the data that is to be used as operands in the operation.

The sideband information can also identify the type of data contained within a row of pixel data. For example, a row may contain local pixel data or global pixel data. Local pixel data is specific to the pixel associated with that row. Global pixel data is an instance of pixel data that is used by the shader program for more than one pixel—instead of being local to a pixel, the value can be shared across multiple rows of pixels, across multiple pixels, and perhaps across multiple groups of pixels. In a sense, a global value is a constant, although the value of a global value can be modified as a result of operations performed by the ALUs.

With each new clock cycle, each row of pixel data proceeds in succession from the data fetch stage to the arithmetic logic stage. For example, row 0 proceeds down the pipeline on a first clock, followed by row 1 on the next clock, and so on. Once all of the rows associated with a particular group of pixels (e.g., a quad) are loaded into the pipeline, rows associated with the next quad can begin to be loaded into the pipeline.

In one embodiment, rows of pixel data for each pixel in a group of pixels (e.g., a quad) are interleaved with rows of pixel data for the other pixels in the group. For example, for a group of four pixels, with four rows per pixel, the pixel data proceeds down the pipeline in the following order: the first row for the first pixel (P0r0 through P0r3), the first row for the second pixel (P1r0 through P1r3), the first row for the third pixel (P2r0 through P2r3), the first row for the fourth pixel (P3r0 through P3r3), the second row for the first pixel (P0r4 through P0r7), the second row for the second pixel (P1r4 through P1r7), the second row for the third pixel (P2r4 through P2r7), the second row for the fourth pixel (P3r4 through P3r7), and so on to the fifteenth row, which includes P3r12 through P3r15. As mentioned above, there may be less than four rows per pixel. By interleaving rows of pixel packets in this fashion, stalls in the pipeline can be avoided, and data throughput can be increased.

Figure 5:
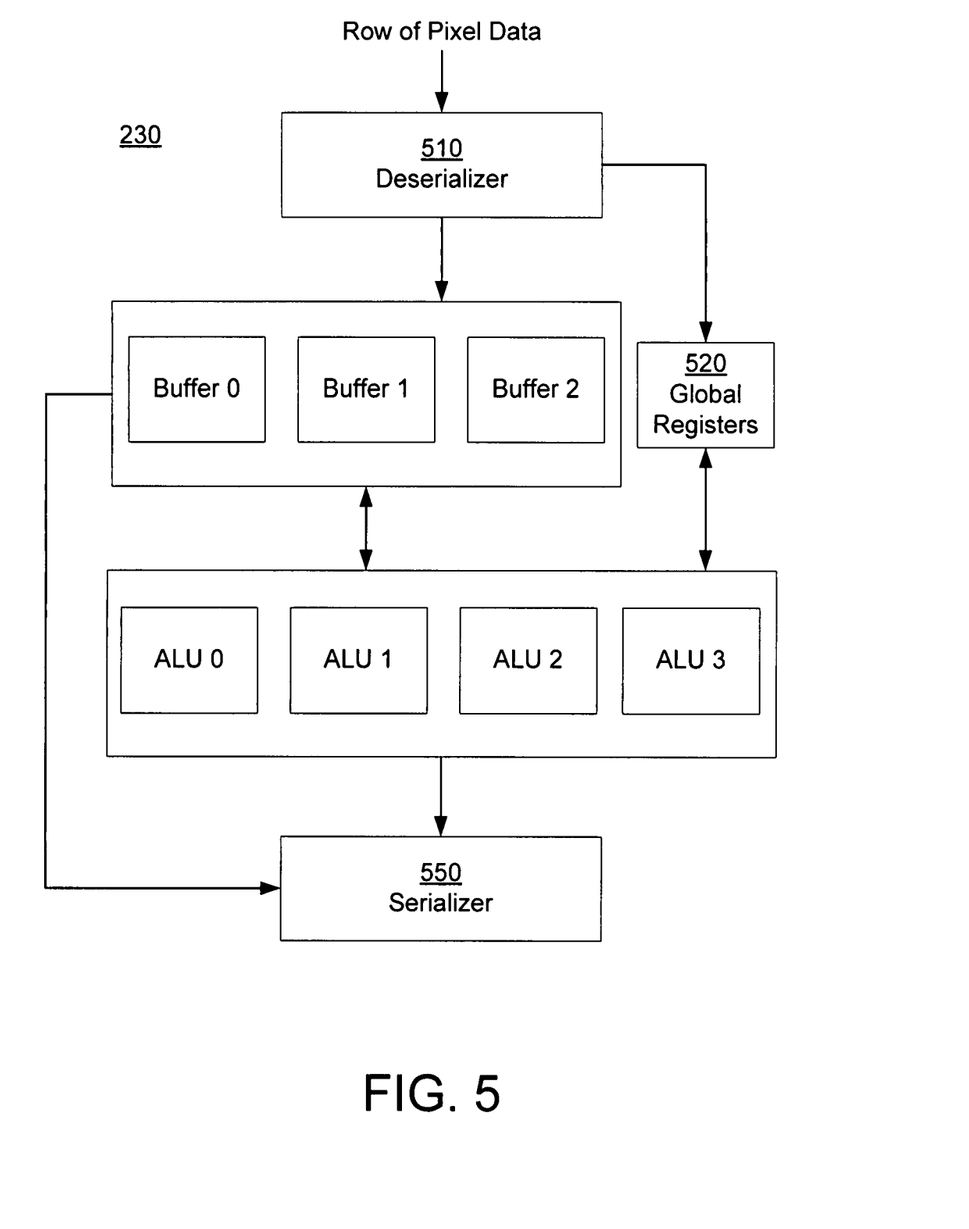
FIG. 5 is a block diagram of an arithmetic logic stage in a GPU according to one embodiment of the present invention.

FIG. 5 is a block diagram of the arithmetic logic stage 230 according to one embodiment of the present invention. Only certain elements are shown in FIG. 5; the arithmetic logic stage may include elements in addition to those shown in FIG. 5 and described below.

A row of pixel data (e.g., row 0) including sideband information 420 is delivered to the deserializer 510 each clock cycle. In the example of FIG. 5, the deserializer deserializes the rows of pixel data. As described above, the pixel data for a group of pixels (e.g., a quad) may be interleaved row-by-row. Also, the pixel data arrives at the arithmetic logic stage row-by-row. Thus, deserialization, as referred to herein, is not performed bit-by-bit; instead, deserialization is performed row-by-row. If the graphics pipeline is four registers wide, and there are four rows per pixel, then the deserializer deserializes the pixel data into 16 registers per pixel.

As mentioned above, some of the pixel data may be identified as local pixel data and other pixel data may be identified as global pixel data. In the example of FIG. 5, the deserializer sends local pixel data for a group of pixels to one of the buffers 0, 1 or 2.

In general, local pixel data is sent to one of the buffers while the pixel data in one of the other buffers is operated on by the ALUs, while the pixel data in the remaining buffer, having already been operated on by the ALUs, is serialized by the serializer 550 and fed, row-by-row, to the next stage of the graphics pipeline. Once a buffer is drained, it is ready to be filled (overwritten) with pixel data for the next group of pixels; once a buffer has been loaded, the pixel data it contains is ready to be operated on; and once the pixel data in a buffer has been operated on, it is ready to be drained (overwritten).

In the example of FIG. 5, the deserializer sends global values to the global registers 520. In one embodiment, there are 32 global registers, each of which can hold a global value. Thus, at any time, there may be up to 32 global values available for ALU operations. As will be seen, any of the 32 global values can be read and utilized during ALU operations.

Once all of the rows of pixel data associated with a particular pixel have been deserialized, the pixel data for that pixel can be operated on by the ALUs. The ALUs are effectively a pipelined processor that operates in SIMD (same instruction, multiple data) fashion across a group of pixels.

In the present embodiment, it takes four clock cycles for a row of pixel data to be operated on—more specifically, for an instruction associated with a row of pixel data to be executed. During the first clock cycle, operands comprising pixel data for a first pixel is read into the ALU. Operands may be local or global values. During the second and third clock cycles, computations are performed on the pixel data—for example, in the second clock cycle, operands may be multiplied in a multiplier, and in the third clock cycle, multiplier results may be added in an adder. During the fourth clock cycle, pixel data is written back to a buffer or to a global register. Also during the second clock cycle, pixel data for a second pixel is read into the ALU—that data follows the pixel data for the first pixel through the remaining stages of the ALUs. Also during third clock cycle, pixel data for a third pixel is read into the ALU—that data follows the pixel data for the second pixel through the remaining stages of the ALUs. Once the ALUs are "primed," pixel data associated with one pixel follows pixel data associated with another pixel through the ALUs as just described.

Figure 6:
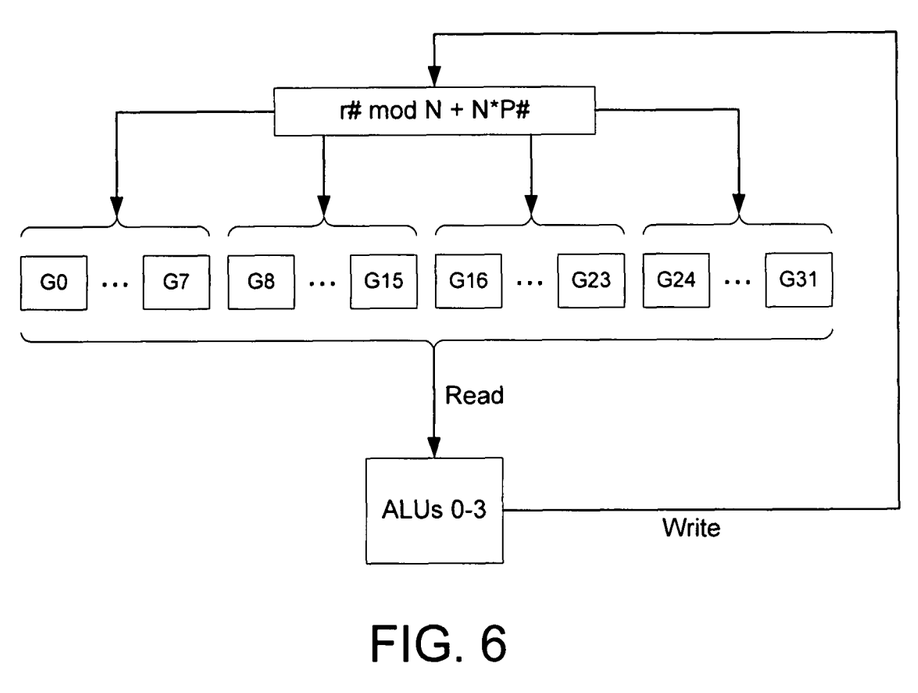
FIG. 6 is a data flow diagram showing global values read and written in an arithmetic logic stage according to an embodiment of the present invention.

FIG. 6 shows global values being read from global registers and written to global registers in an arithmetic logic stage according to one embodiment of the present invention. In the example of FIG. 6, there are 32 global registers; however, the present invention is not so limited.

As described above, pixel data enters the ALUs each clock cycle and, once the ALUs are primed, pixel data exits the ALUs each clock cycle. When processing pixel data in the ALUs, one or more global values may be used as operands during the processing. According to embodiments of the present invention, a global value in any of the global registers may be read and used while processing pixel data for any pixel.

More specifically, each clock cycle, the ALUs execute an instruction. The instruction, among other things, specifies a source for each operand needed by the ALUs, and also specifies a destination for the result of the ALU operations. The input operands may be read from the buffers 0-2 (FIG. 5), the global registers G0-G31, or a combination of the buffers and global registers. In the present embodiment, local pixel data is read from a buffer, and global pixel data is read from a global register. Importantly, for reads, an instruction may identify any of the global registers as a source of a global value, regardless of which row, pixel or group of pixels the global value is associated with.

Each clock cycle, once the ALUs are primed, their output(s) can be written to either a buffer or a global register. Each result is associated with a particular pixel—the pixel associated with the pixel data that is exiting the ALUs. Local pixel data results are written back to a buffer, and global values are written back to the global registers.

In one embodiment, the same instruction, and hence the same destination for results of ALU operations, is applied to each pixel in a group of pixels. For example, an instruction may specify that the result be written to global register G2—this instruction is applied to each of the pixels P0-P3 in a quad. Consequently, a result associated with the processing of pixel P0, which precedes other pixels through the ALUs, will be written to register G2. Likewise, a result associated with the processing of pixel P1, which follows pixel P0 through the ALUs, will overwrite the current value in register G2 (the value just written there for pixel P0), unless proper controls are in place.

Figure 7:
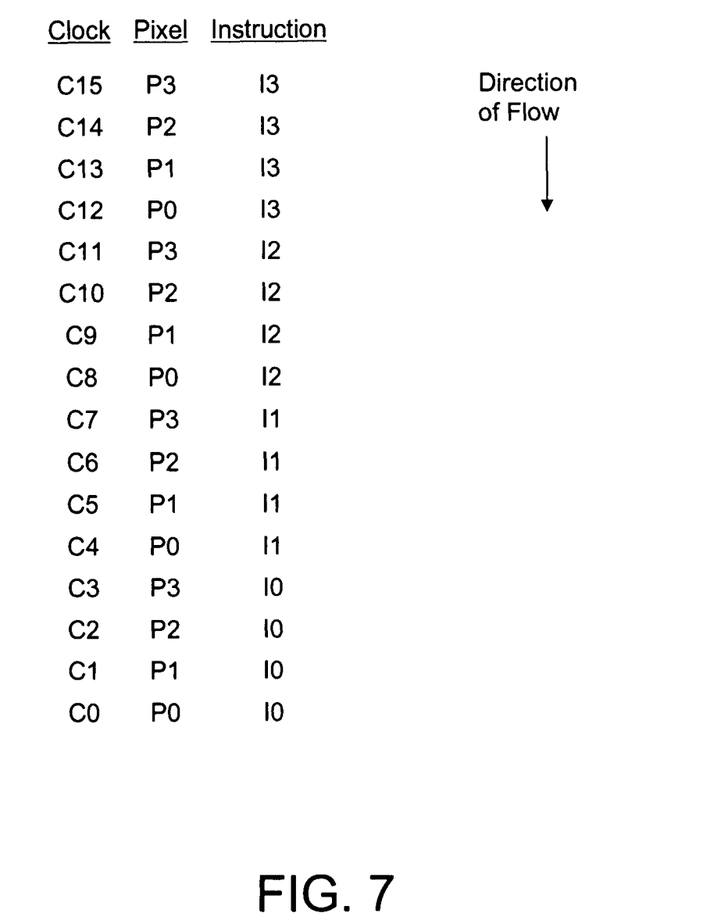
FIG. 7 illustrates pixel data exiting an arithmetic logic unit according to an embodiment of the present invention.

More specifically, in one embodiment, the ALUs execute one instruction per pixel (four instructions per group of pixels), and it can take four clock cycles to execute an instruction. FIG. 7 shows pixel results exiting the ALUs over arbitrarily chosen clock cycles 0-15. In clock cycles 0-3, pixel results associated with execution of a first instruction 10, using pixel data for the pixels P0-P3, exit the ALUs—these results, though for different pixels, will have the same destination (the destination specified by instruction 10). Similarly, pixel results associated with execution of a second instruction 11, using pixel data for the pixels P0-P3, exit the ALUs—these results, though for different pixels, will have the same destination (the destination specified by instruction 11); and so on. Without proper controls, in clock cycle 1, for example, the results associated with pixel P1 would overwrite the results associated with pixel P0; in clock cycle 2, the results associated with pixel P2 would then overwrite the results associated with pixel P1; and so on. Embodiments of the present invention provide controls that guard global values against being overwritten.

In one embodiment, for writes, the set of global registers is logically separated into disjoint subsets—each subset is associated with one of the pixels in the group of pixels, and a global register that is a member of one subset is not a member of any of the other subsets. In one such embodiment, the number of registers per subset is the number N of global registers in the arithmetic logic stage divided by the number M of pixels in a group of pixels. For example, if there are 32 global registers and four pixels in a group, then there would be eight global registers per subset. Thus, for writes, in one embodiment the global registers G0-G7 are associated only with pixel P0, the global registers G8-G15 are associated only with pixel P1, the global registers G16-G23 are associated only with pixel P2, and the global registers G24-G31 are associated only with pixel P3. Consequently, in one embodiment, a global value resulting from ALU operations on the data for pixel P0 can be written only to a global register in the subset that includes registers G0-G7, a global value resulting from ALU operations on data for pixel P1 can be written only to a global register in the subset that includes registers G8-G15, and so on.

In one embodiment, for writes, a result of an ALU operation is automatically routed to a global register that is selected according to which pixel is associated with the result. In one such embodiment, the register that the result is to be written to is computed as follows: (r# mod(N/M))+N/M*P#, where r# is the destination register number identified in an instruction, N is the number of global registers, M is the number of pixels in a group, and P# is the pixel number associated with the result (e.g., for a quad of pixels, P# can be 0, 1, 2 or 3). Thus, a different destination is computed for each pixel in the group.

For example, an instruction may specify that the result of an operation should be written to global register G1. The instruction would be the same for each pixel in the group of pixels. However, according to embodiments of the present invention, only the result associated with pixel P0 would be written to register G1. The destination of the result for pixel P1 would be renamed, or aliased, as register G9; the destination for the result for pixel P2 would be renamed as register G17; and the destination for the result for pixel P3 would be renamed as register G25. As mentioned above, in one embodiment, the destination is renamed in hardware by computing a new destination register number for each pixel in the group. Subsequent read operations that rely on these results can be directed to the proper global register—that is, when programming subsequent operations such as reads, the aliasing of destinations is recognized and can be accounted for in the programming, so that the proper global register is accessed for the global value needed.

In another embodiment, a result of an ALU operation is automatically routed to multiple destination registers. In one such embodiment, the registers that the results are to be written to are computed as follows: (r#+(P#)*(N/M)) mod N. Thus, for example, a write to register G21 would be translated into writes to registers G5, G13, G21 and G29.

To summarize, according to embodiments of the present invention, a pixel shader can write global values to memory (e.g., to the global registers G0-G31). By controlling which of the global registers are written to when processing a given pixel, global values that may be needed for subsequent operations are guarded against being overwritten (of course, instances in which data in the global registers is properly overwritten are still permitted—embodiments of the present invention do not prevent those types of writes from occurring). Use of global registers in the manner described herein promotes programming flexibility without a commensurate increase in the number of registers. Accordingly, embodiments of the present invention facilitate quick and efficient graphics processing within the size and power constraints associated with handheld devices and other portable, battery-operated devices.

Figure 8:
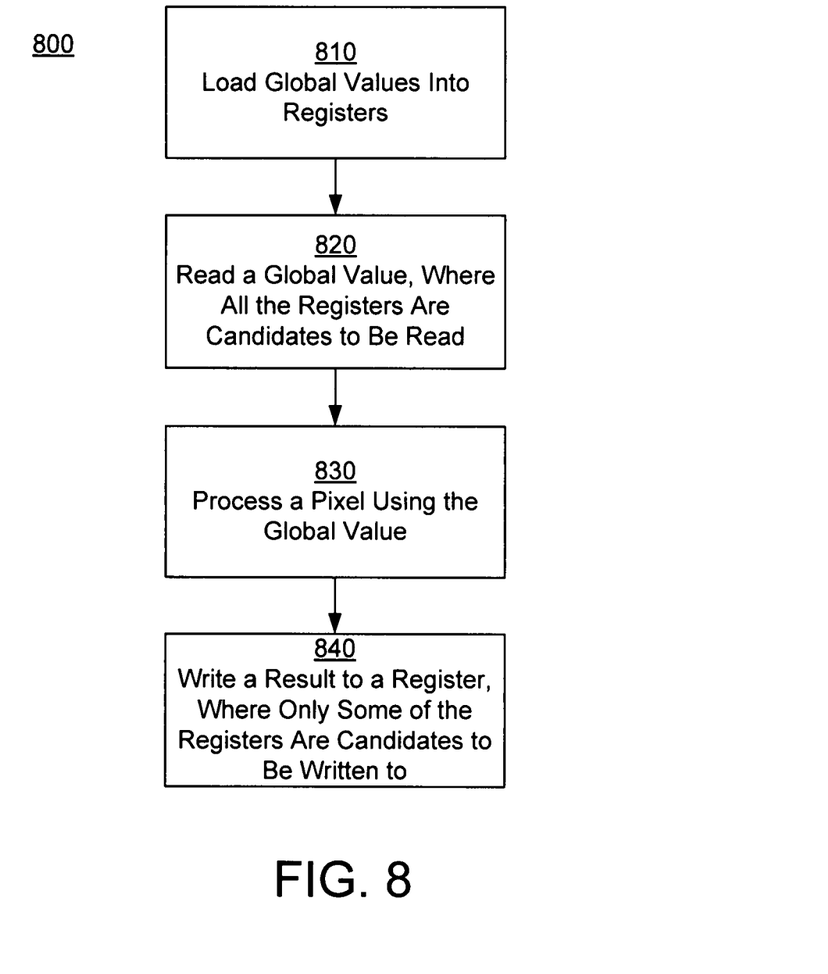
FIG. 8 is a flowchart of a computer-implemented method for processing pixel data according to one embodiment of the present invention.

FIG. 8 is a flowchart 800 of an example of a computer-implemented method for processing pixel data in a graphics processor unit pipeline according to one embodiment of the present invention. Although specific steps are disclosed in the flowchart, such steps are exemplary. That is, embodiments of the present invention are well-suited to performing various other steps or variations of the steps recited in the flowchart. The steps in the flowchart may be performed in an order different than presented.

In block 810, global values for a first plurality of pixels are loaded into global registers that can be accessed by the ALUs in an arithmetic logic stage of a graphics pipeline. In block 820, a global value is read from a global register. Any of the global registers is a candidate to be read from. In block 830, pixel data (e.g., a first row of pixel data) for a first pixel in a first group of pixels is processed by the ALUs using the global value selected.

In block 840, a result of the processing is written to a selected global register or registers. Global register(s) that can be written to are those associated with the pixel processed in block 830. That is, although a global value may be read from any of the global registers, a global value may be written to only certain global registers, depending on pixel number.

In one embodiment, an instruction that identifies the destination for the processing result is accessed. In one such embodiment, the instruction identifies the same destination for each of the pixels in the first group of pixels. Nevertheless, the result is automatically routed to the selected global register or registers. In one embodiment, this is accomplished by automatically computing a new destination or destinations for the result based on pixel number as described above.

Because the global values in the global registers are not necessarily overwritten, the global values can be subsequently used to process a second row of pixel data, a second pixel, and/or a second group of pixels.

The foregoing descriptions of specific embodiments of the present invention have been presented for purposes of illustration and description. They are not intended to be exhaustive or to limit the invention to the precise forms disclosed, and many modifications and variations are possible in light of the above teaching. For example, embodiments of the present invention can be implemented on GPUs that are different in form or function from the GPU 110 of FIG. 2. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An arithmetic logic stage in a graphics processor unit, the stage comprising:

a plurality of arithmetic logic units (ALUs) operable for performing operations using a set of input operands for a plurality of pixels comprising more than one pixel, each of the pixels in the plurality of pixels having a unique pixel number associated therewith, wherein the ALUs are programmable by an instruction that is applied to all pixels in the plurality of pixels; and a plurality of registers coupled to the plurality of ALUs and operable for storing a plurality of global values, wherein global values included in the set of input operands are readable from any register in the plurality of registers, and wherein, when the instruction designates a same destination for global values, the results of the operations are written to different destinations instead of to the same destination identified in the instruction, the different destinations selected from a designated subset of the plurality of registers, wherein a register in the designated subset is selected as a destination for receiving a result for a pixel in the plurality of pixels, the destination different from that specified in the instruction, the destination for receiving the result selected by computing a register number uniquely associated with the register, the register number computed as a function of the unique pixel number associated with the pixel and the destination specified in the instruction, the function defined so that only the result for the pixel is writeable to the register.

2. The arithmetic logic stage of claim 1 further comprising a buffer coupled to the plurality of ALUs, wherein the buffer stores pixel data in addition to the global values.

3. The arithmetic logic stage of claim 2 wherein the instruction identifies sources for the input operands, wherein the sources are selected from the group consisting of: the plurality of registers; the buffer; and a combination of the plurality of registers and the buffer.

4. The arithmetic logic stage of claim 2 wherein the instruction identifies the destination for the result of the operation, wherein the destination is selected from the group consisting of: the designated subset; and the buffer.

5. The arithmetic logic stage of claim 1 wherein the plurality of registers comprises 32 registers.

6. The arithmetic logic stage of claim 1 wherein the plurality of pixels comprises four pixels, wherein the designated subset is one of a plurality of disjoint subsets of the plurality of registers, each of the disjoint subsets comprising one-fourth of the plurality of registers.

7. The arithmetic logic stage of claim 1 wherein the instruction identifies a register number as the same destination, wherein the designated subset includes N registers, and wherein the register number for receiving the result is computed by computing (the register number identified in the instruction modulo N) plus (N times the unique pixel number for the pixel).

8. A graphics pipeline in a graphics processor unit, the pipeline comprising:

a data fetch stage that fetches pixel data for a plurality of pixels comprising more than one pixel, each of the pixels in the plurality of pixels having a unique pixel number associated therewith; and an arithmetic logic stage coupled to the data fetch stage and comprising:

a plurality of arithmetic logic units (ALUs) for executing a shader program, wherein the ALUs are programmable by an instruction that is applied to all pixels in the plurality of pixels and that identifies a same destination for results of the operations associated with all pixels in the plurality of pixels, the same destination comprising a single register; and a plurality of registers coupled to the plurality of ALUs and operable for storing global values used by the shader program, wherein each of the global values comprises pixel data that is used by the shader program during processing of more than one pixel;

wherein any register in the plurality of registers is readable by the shader program when processing pixel data for a first pixel, and wherein the global values generated by the shader program include a global value for the first pixel and are written to different destinations instead of to the same destination identified in the instruction, the different destinations selected from a designated subset of the plurality of registers, wherein a register in the designated subset is selected to receive the global value generated by the shader program for the first pixel, the register different from that specified in the instruction, the register selected by computing a register number uniquely assigned to the register, the register number computed as a function of the unique pixel number associated with the first pixel and the destination specified in the instruction, the function defined so that only the global value generated for the first pixel is writeable to the register.

9. The graphics pipeline of claim 8 further comprising a buffer coupled to the plurality of ALUs, wherein the buffer stores pixel data for the plurality of pixels other than the global values.

10. The graphics pipeline of claim 8 wherein the instruction identifies a register number as the same destination, and wherein the register that receives the global value for the first pixel is selected by computing (the register number identified in the instruction modulo N) plus (N times the unique pixel number for the first pixel), where N is the number of registers in the subset of registers.

11. The graphics pipeline of claim 8 wherein the plurality of registers comprises 32 registers.

12. The graphics pipeline of claim 8 wherein the plurality of pixels comprises four pixels.

13. A computer-implemented method of processing pixel data in a graphics processor unit pipeline, the method comprising:

loading a plurality of global values for a first plurality of pixels into a plurality of registers accessible by a plurality of arithmetic logic units (ALUs), the first plurality of pixels comprising more than one pixel, each of the pixels in the first plurality of pixels having a unique pixel number associated therewith, wherein the ALUs are programmable by an instruction that is applied to all pixels in the first plurality of pixels and that identifies a same destination for results of the operations associated with all pixels in the first plurality of pixels, the same destination comprising a single register;

reading a global value from a register in the plurality of registers, wherein any of the registers in the plurality of registers is a candidate to be read from;

processing a first pixel of the first plurality of pixels using the global value selected; and writing a global value result of the processing to a register of the plurality of registers, wherein the result is written to different destinations instead of to the same destination identified in the instruction, the different destinations selected from a designated subset of the plurality of registers, wherein a register in the designated subset is selected as a destination for receiving the result for the first pixel, the destination for the result different from the destination specified in the instruction, the register selected by computing a register number uniquely associated with the register, the register number computed as a function of the unique pixel number associated with the first pixel, the function defined so that only the result for the first pixel is writeable to the register.

14. The method of claim 13 wherein the plurality of registers comprises 32 registers.

15. The method of claim 13 wherein the first plurality of pixels comprises four pixels, wherein the designated subset is one of a plurality of disjoint subsets of the plurality of registers, each of the disjoint subsets comprising one-fourth of the plurality of registers.

16. The method of claim 13 further comprising selecting the register that receives the result for the first pixel by computing (the register number identified in the instruction modulo N) plus (N times the unique pixel number for the first pixel), wherein the subset of registers includes N registers.

17. The method of claim 13 further comprising processing pixels in a second plurality of pixels using the global values stored in the plurality of registers.

* * * * *